United States Patent
Watson et al.

(10) Patent No.: US 6,831,974 B1
(45) Date of Patent: Dec. 14, 2004

(54) SYSTEM AND METHOD FOR PROVIDING A CALLER IDENTIFICATION TO A CALLED PARTY FOR CALLS RELAYED THROUGH A CALL CENTER

(75) Inventors: Thomas Michael Watson, Raymore, MO (US); Paul W. Ludwick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 901 days.

(21) Appl. No.: 09/699,864

(22) Filed: Oct. 30, 2000

(51) Int. Cl.⁷ ............................. H04M 3/00; H04M 5/00
(52) U.S. Cl. ............... 379/265.02; 379/52; 379/218.01; 379/355.07; 379/142.04
(58) Field of Search ............................. 379/52, 265.01, 379/265.02, 266.1, 142.01, 142.04, 142.09, 142.14, 142.15, 142.17, 207.15, 218.01, 262, 263, 264, 267, 309, 353, 355.06, 355.07

(56) References Cited

U.S. PATENT DOCUMENTS

| | | | | |
|---|---|---|---|---|
| 4,893,336 A | * | 1/1990 | Wuthnow | 379/211.02 |
| 4,996,704 A | * | 2/1991 | Brunson | 379/88.19 |
| 5,206,900 A | * | 4/1993 | Callele | 379/142.06 |
| 5,559,857 A | * | 9/1996 | Dowens | 379/52 |
| 5,574,776 A | * | 11/1996 | Leuca et al. | 379/127.01 |
| 5,613,006 A | * | 3/1997 | Reese | 379/67.1 |
| 5,680,443 A | * | 10/1997 | Kasday et al. | 379/88.13 |
| 5,787,148 A | | 7/1998 | August | |
| 5,825,862 A | * | 10/1998 | Voit et al. | 379/142.16 |
| 5,901,209 A | * | 5/1999 | Tannenbaum et al. | 379/142.09 |
| 5,926,539 A | | 7/1999 | Shtivelman | |
| 6,046,762 A | | 4/2000 | Sonesh et al. | |
| 6,137,870 A | * | 10/2000 | Scherer | 379/127.06 |
| 6,381,472 B1 | * | 4/2002 | LaMedica et al. | 455/560 |
| 6,510,206 B2 | * | 1/2003 | Engelke et al. | 379/52 |
| 6,546,082 B1 | * | 4/2003 | Alcendor et al. | 379/52 |
| 6,594,352 B1 | * | 7/2003 | Smith | 379/114.01 |
| 6,603,835 B2 | * | 8/2003 | Engelke et al. | 379/52 |
| 6,738,468 B1 | * | 5/2004 | Gilbert | 379/218.01 |

FOREIGN PATENT DOCUMENTS

| | | |
|---|---|---|
| EP | 0821510 A2 | 1/1998 |
| EP | 0848552 A1 | 6/1998 |
| WO | WO 99/14951 | 3/1999 |

OTHER PUBLICATIONS

Fisher, James, "Sprint Announces New Service for Deaf in Texas"Sep. 6, 1996, Kansas City, MO, http://144.226.116.29/PR/CDA/PR_CDA_Press_Releases_Detail_PF/0,1586,1460,00.html.

Luxner, Larry, "VRI adds visual dimension for the hearing-impaired," Telephony XP-002222502, Aug. 12, 1996, Primedia Business Magazines & Media, Inc.

Hadley, Terry, "Texas Launches Video Relay Service Deaf & Hard-of-Hearing Benefit from Improved Communications," News Releases Public Utility commission of Texas, XP-002222503, Austin, TX, Sep. 1, 2000.

* cited by examiner

Primary Examiner—Roland G. Foster

(57) ABSTRACT

A system for providing a telephone number of a calling party to a called party for calls being handled at a call center. First the call center receives a first call set-up message in a switching system to set-up an incoming call to a terminal in the call center. The call center then extends the incoming call from the switching system to the terminal. The call center then receives a request in the switching system from the terminal to set-up an outgoing call to a called party. The call center then generates a second call set-up message including an identification of the calling party and the call set-up message to the called party.

26 Claims, 5 Drawing Sheets

SYSTEM AND METHOD FOR PROVIDING A CALLER IDENTIFICATION TO A CALLED PARTY FOR CALLS RELAYED THROUGH A CALL CENTER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the provision of telecommunication services to the deaf and hearing impaired. More particularly, the invention is related to a call center for handling TTY calls for the deaf and hearing impaired. Still more particularly, this invention is related to providing an identification of a calling party to a called party that is hearing impaired.

2. Description of the Prior Art

Title IV of the Americans with Disabilities Act of 1990 requires the Federal Communications Commission (FCC) to ensure that telecommunication services are provided to the hearing and speech impaired. Telecommunication Relay Services (TRS) are used provide the functional equivalent of telecommunication services to the hearing and speech impaired. TRS have been available on a nationwide basis since 1983.

TRS operates in the following manner. A calling party for this system may be as a hearing or speech impaired person or a person wishing to talk to the hearing or speech impaired. The calling party has a TDD/TYY or other device, such as a personal computer, which is a device for transmitting and receiving typed messages. The calling party places a call by dialing a local toll free number. The call is extended to a communication assistant terminal in the call center. The call is a modem connection between the calling party and the communication assistant terminal. The calling party then types a telephone number that the calling party wishes to call. A call is then placed by the communication assistant to the telephone number. When a call is established with a party at the desired telephone number, the calling assistant relays the messages between the calling party and the called party. The calling party types in messages that are read by the calling assistant to the called party. The called party speaks to the calling assistant, who types in the called party's message. This operation is performed in an opposite manner when a person is calling a hearing or speech impaired person.

The local toll free number called by a party extends the call to a call center that provides TRS. In a conventional call center, a switching system is connected to a modem in each of terminals and to a call controller. One type of switching system typically used in a call center is a Rockwell Galaxy ACD switch. The call controller is a system having a processing unit and associated memory.

The call controller determines which terminal is available to handle a call. When the switching system receives a request for a call set-up, the switching system transmits a request to the call controller for an available terminal. The call controller responds to the Mu switching system by transmitting an identity of an available terminal. The switching system then extends the call to the identified terminal.

Each terminal includes a computer system that can convert signals received via modem into a text message that is displayed upon a screen. Each terminal also has a telephone station connected to the switching system to receive and to place voice telephonic calls. The communication assistant can enter text into the computer system via a keyboard. The computer system converts the entered text into text messages transmitted to a calling party over the connection established by the modem. The computer is also connected to a network. When a call is completed to a terminal, a Call Detail Record (CDR) is generated by the computer system. The call detail record includes information pertaining to the length of the call. The CDR is then stored by computer system.

A billing system is then connected to each terminal via the network. Periodically, each computer system transmits stored CDRs to a billing system for processing. The billing system then uses the CDRs to generate billing.

It is a problem that there is currently no way of sending a caller identification though the call center to a called party. Currently, when a called party receives a call from a call center providing TRS, the caller identification transmitted to the calling party either includes the identification of the call center or no identification whatsoever. This prevents the called party from knowing the identity of the calling party. Therefore, telephone service for the speech and hearing impaired is not functionally equivalent to that of the hearing users.

SUMMARY OF THE INVENTION

The above and other problems are solved and an advance in the art is made by a call center of this invention. A first advantage of this invention is that a called party having the proper equipment can determine the identity of the calling party before answering a call. A second advantage of this invention is that identification can be used to charge calling parties for some services, such as directory information, instead of the provider bearing the cost. These and other advantages are apparent in the description given below.

The call center of this invention includes a switching system, terminals connected to the switching system, and a call controller connected to the terminals via a network and connected to the switching system via a data link. The call center operates in the following manner to provide a called party an identification of a calling party for calls relayed by the call center.

First, a switching system receives a first call set-up message requesting that an incoming call be connected to a terminal in the call center. The incoming call is extended by the switching system to a terminal in the call center. Then, the switching system receives a request from the terminal to set-up an outgoing call to a called party. The switching system generates a second call set-up message including an identification of the calling party and transmits the second call set-up message to the called party.

In order to generate the second call set-up message, the switching system transmits a request for the identity of the calling party. The request is transmitted either to the call controller via a data link or to the terminal via out of band signals over the connection. The switching system then receives a response to the request that includes the identity of the calling party.

In an embodiment where the request for the calling party identification is transmitted to a call controller, the call controller transmits an identification request to the terminal to get the identification of the calling party. The terminal generates an identification response that includes the identification of the calling party and transmits the response to the call controller. The call controller receives the identification response from the terminal. A response including the identification of the calling party is then generated and transmitted to the switching system.

DETAILED DESCRIPTION

Figure 1:
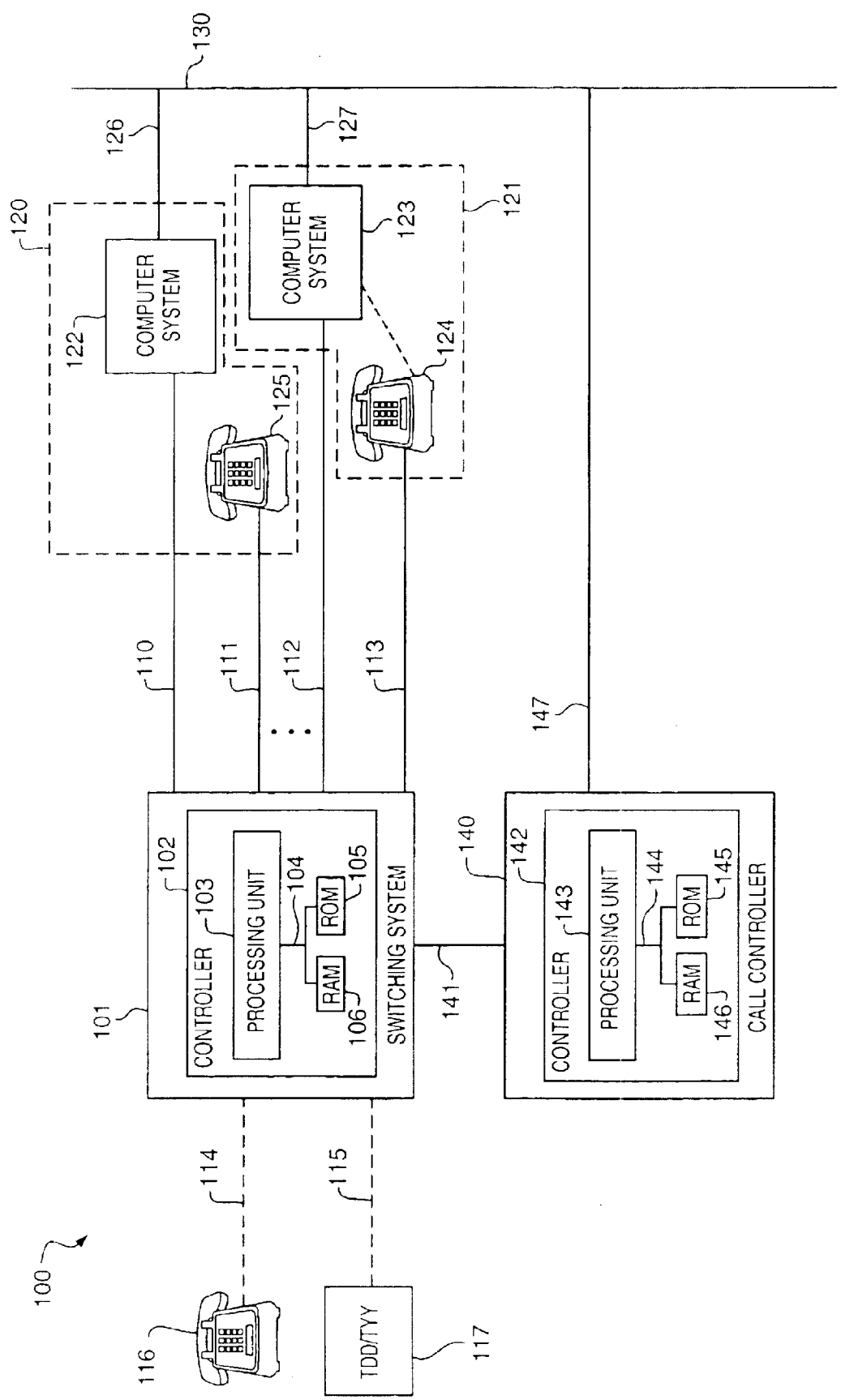
FIG. 1 illustrates a call center.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

FIG. 1 illustrates a call center 100 that provides a called party with an identification of a calling party in accordance with this invention. Call center 100 is connected to a switching system 101. Switching system 101 may be included in the call center or external to call center 100. One example of a switching system 101 connected to a call center 100 is a Rockwell ACD switch. However, switching system 101 may be any device that provides telecommunication services between a calling and a called party. In a preferred exemplary embodiment, switching system 101 provides ISDN service and a protocol such as SS7 to provide telephone service. However, any system that provides for signaling and provides calling party identification may incorporate this invention.

Switching system 101 includes a controller 102. Controller 102 executes applications which control the functions performed by switching system 101. Controller 102 includes a processing unit 103. For purposes of this application, a processing unit may be a microprocessor, processor, group of microprocessors, or group of processors that execute instructions stored in a memory to perform functions of a device. Processing unit 103 is connected to a non-volatile memory, such Read Only Memory 105 via bus 104. Non-volatile memory stores instructions needed by processing unit 103 to operate the system of controller 102. A non-volatile memory, such as Random Access Memory (RAM) 106, is also connected to processing unit 103 via bus 104.

Switching system 101 is connected to a TDD/TYY device 117 or other personal communication device via path 115 and to telephone station 116 via path 114. Paths 114 and 115 may be direct connections to switching system 101 or may be connections via a network, such as the public telephone switching network. Switching system 101 is also connected to a plurality of terminals 120–121 in call center 100. It should be noted that only two terminals are shown. However, any number of terminals that switching system 101 supports may be connected to switching system 101.

Each terminal 120–121 includes a computer system 122–123 and a telephone station 124–125. Computer systems 122–123 may be personal computers made by any of a number of manufacturers. Computer systems 122–123 include modems or other network connection devices that allow connections to switching system 101 via paths 110 and 112. Software executed by computer systems 122–123 allows communication with TDD/TYY or ASCII devices by transmitting data over a telephone call. Computer systems 122–123 are also connected to a network 130 that allows the computer systems 122–123 to communicate with other devices in call center 100. One skilled in the art will note that only the devices essential to operation of this invention are shown for brevity of this description.

Telephone stations 124–125 are conventional telephone sets which allow voice communication over a telephone call. Telephone stations 124–125 are connected in some manner to computer systems 122–123 to allow computer systems 122–123 to monitor for an off-hook condition.

Call controller 140 is a device that maintains the status of all terminals 120–121 in call center 100 and determines which terminal handles an incoming telephone call. Switching system 101 is connected to call controller 140 via data link 141. Information pertaining to which terminal 120–121 handles an incoming telephone call is transmitted over data link 141. Call controller 140 is also connected to network 130 via path 147. Terminals 120–121 communicate with call controller 140 via network 130.

Call controller 140 includes a controller 142 that executes the instructions to provide applications that perform the functions of call controller 140. Controller 142 includes a processing unit 143 that executes instructions. Processing unit 143 is connected to a non-volatile memory, such Read Only Memory 145 via bus 144. Non-volatile memory stores instructions needed by processing unit 143 to operate the system of controller 142. A non-volatile memory, such as Random Access Memory (RAM) 146, is also connected to processing unit 143 via bus 144. RAM 146 stores instructions and data for applications being executed by processing unit 143.

Figure 2:
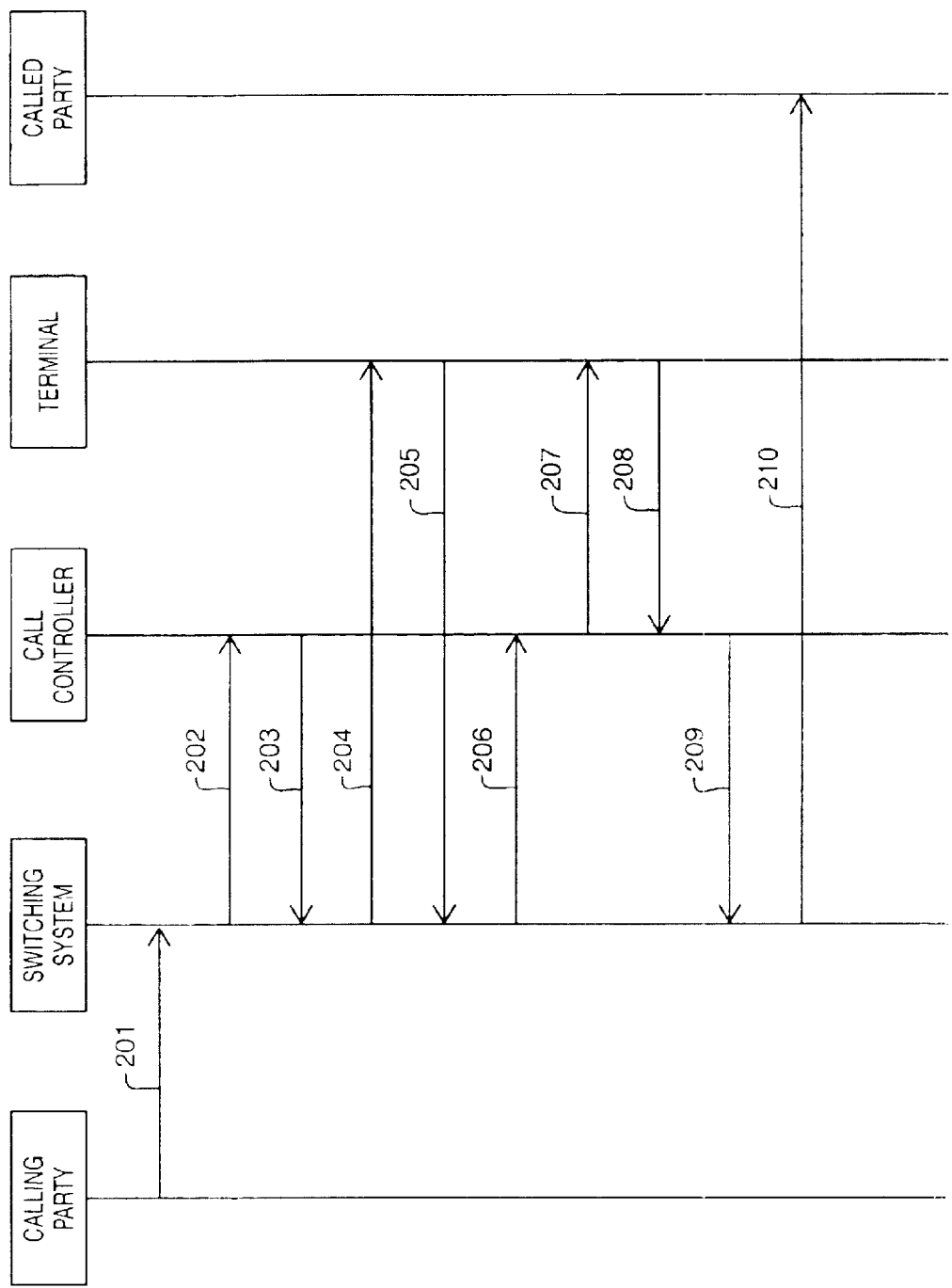
FIG. 2 illustrates a signaling chart for implementing this invention.

FIG. 2 illustrates a signaling chart showing the messages transmitted between the components of call center 100 to provide the calling party identification of this invention. A call is extended in the following manner. First, a call set-up message 201 for an incoming call from a calling party is received by switching system 101. For purpose of this discussion, the calling party may be communicating via a voice call from telephone set 116 or via a TDD/TYY call from TDD/TYY device 117. The call set-up message 201 may be an LAM message commonly used to establish a telephone connection.

In response to receiving call set-up message 201, switching system 101 transmits a request 202 for an available terminal 120-121 to call controller 140. Request 202 may include an indication as to whether the incoming call is a voice call or a modem (TDD/TYY) call. Call controller 140 determines which available terminal 120–121 will handle the incoming call and transmits a response 203 to switching system 101 which is, includes an identification of a terminal that will handle the incoming call. The response 203 may include an identification of the telephone station 125 or computer system 122 in the terminal.

Switching system 101 receives response 203 and extends a ring to the terminal identified in the response 204. In response to the ring generated by switching system 101, the call is completed by a response from the terminal. In a relay system, an outgoing call must be completed after an incoming call is received. To attempt an outgoing call, the terminal transmits a request 205 to switching system 101. The request may be dialed digits as in a conventional telephone call.

In response to receiving request 205 from a terminal, switching system 101 transmits a request 206 for an identification of the calling party that called terminal 120–121. In a preferred embodiment, the request 206 is transmitted to the call controller 140. However, one skilled in the art will recognize that it may be possible to communicate directly with a computer system 122 in the terminal.

In the preferred embodiment, call controller 140 receives request 206. In order to respond to request 206, call controller 140 transmits a request 207 to the terminal 120–121. Request 207 is a message requesting the calling party identification. Terminal 120–121 then generates and transmits a reply 208 to call controller 140. Reply 208 includes the identification of the calling party.

Call controller 140 uses the information including calling party identification in reply 208 to generate a response 209. Response 209 is then transmitted to switching system 101. Switching system 101 then generates a call set-up message 210 that includes the identification of the calling party. The identification of the calling party may be substituted for the identification of the call center or may be added to the message as additional data. The placement of the identification of the calling party is left to those skilled in the art. Call set-up message 210 is then transmitted over the switching network to the called party.

Figure 3:
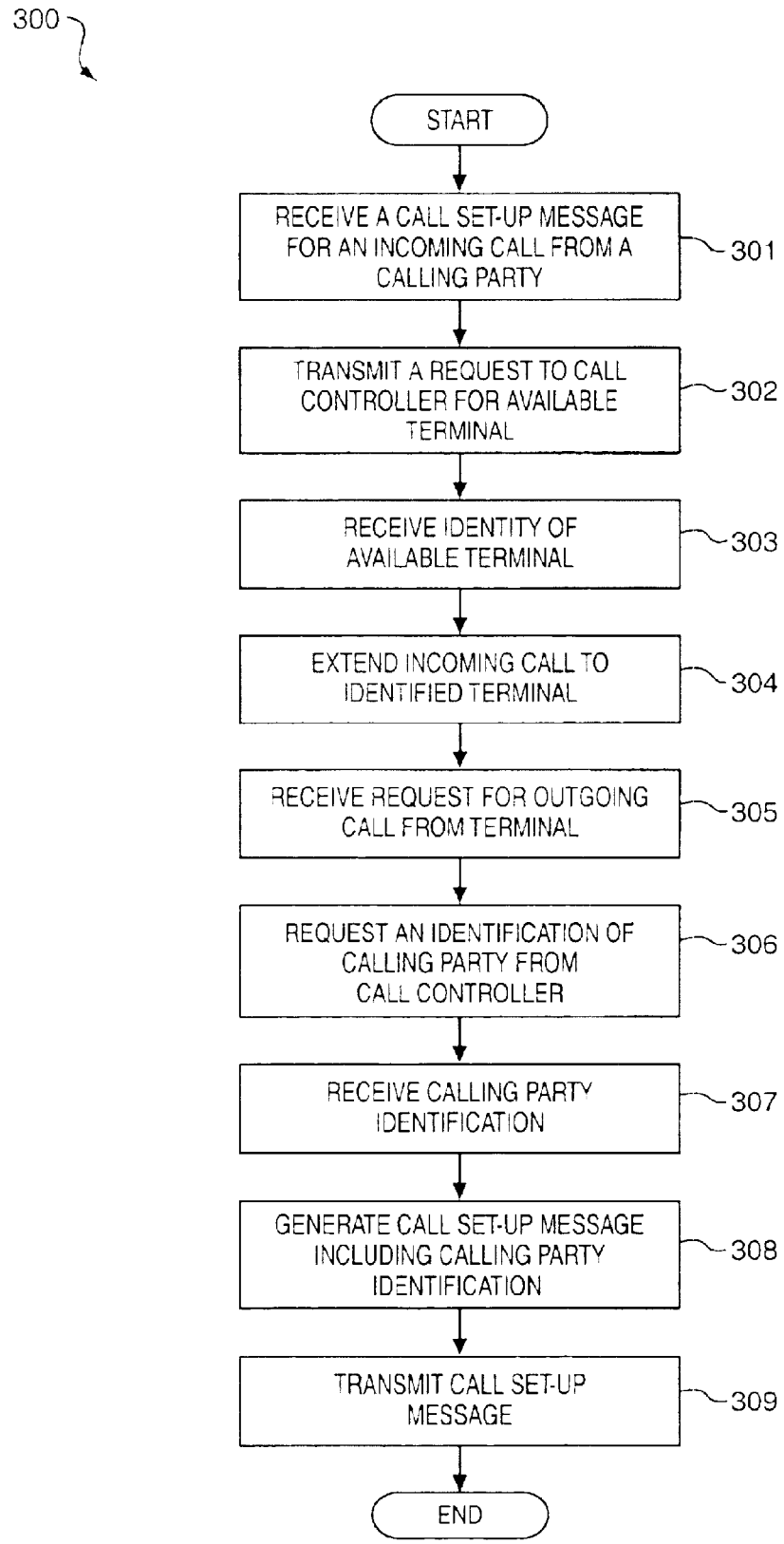
FIG. 3 illustrates a flow diagram for a process executed by a switch to provide this invention.

FIG. 3 illustrates the operational steps performed by switching system 101 to provide a calling party identification to a called party. Process 300 begins in step 301 by receiving a call set-up message for an incoming call from a calling party. In response to receiving the call set-up message, switching system 101 transmits a request for an available terminal that can handle the incoming call in step 302. In step 303, switching system 101 receives a response from call controller 140. The response includes an identity of an available terminal 120–121 that will handle the call. The identity may be the telephone number of either the telephone station 124–125 in the terminal or the computer system 122–123.

The call is then extended to the terminal 120–121 identified in the response in step 304. In step 305, the switching system 101 receives a request for an outgoing call from the terminal. In response to receiving the outgoing call, switching system 101 requests the calling party identification in step 306. In the preferred embodiment, the request is sent to a call controller. However, it is possible that the switching system could communicate directly with the terminal.

In step 307, switching system 101 receives a response that includes the calling party identification. This response is from call controller 140 in the preferred embodiment. However, the terminal may transmit the response if the switching system and the terminal communicate directly. Switching system 101 generates a call set-up message that includes the identification of the calling party in step 308. The calling party identification may replace the identification of the call center or may be included along with the identification of the call center. Process 300 ends in step 309 with switching system 101 transmitting the call set-up message.

Figure 4:
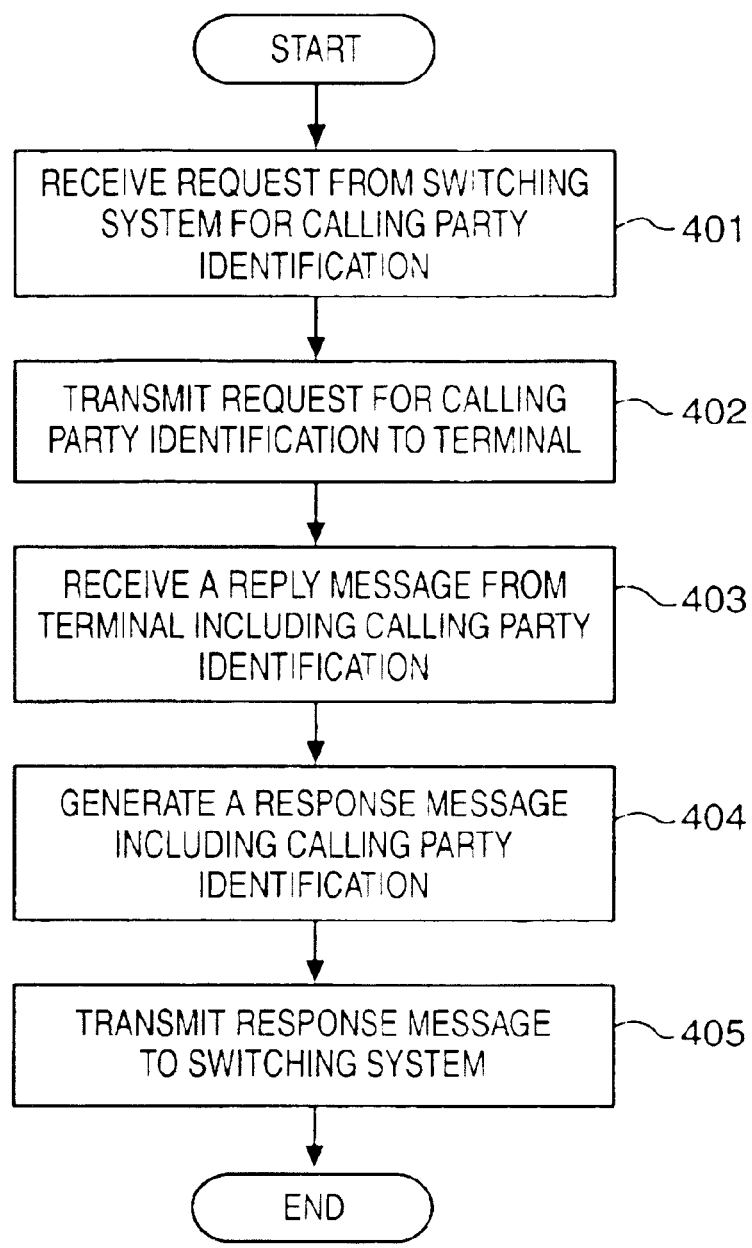
FIG. 4 illustrates a flow diagram of a process executed by a call controller to provide this invention.

FIG. 4 illustrates the operational steps of a process executed by call controller 140 to provide the calling party identification in a preferred embodiment of this invention. Process 400 begins in step 401 when call controller 140 receives a request from switching system 101 for a calling party identification for an outgoing call from a terminal. The request may include the identification of the terminal. Call controller 140 transmits a request for the calling party identification in step 402. In step 403, call controller 140 receives a reply message from terminal 120–121 that includes the calling party identification.

The calling party identification received in the reply message is then used to generate a response message to transmit to switching system 101 in step 404. Process 400 then ends in step 405 with call controller 140 transmitting the response message to switching system 101.

Figure 5:
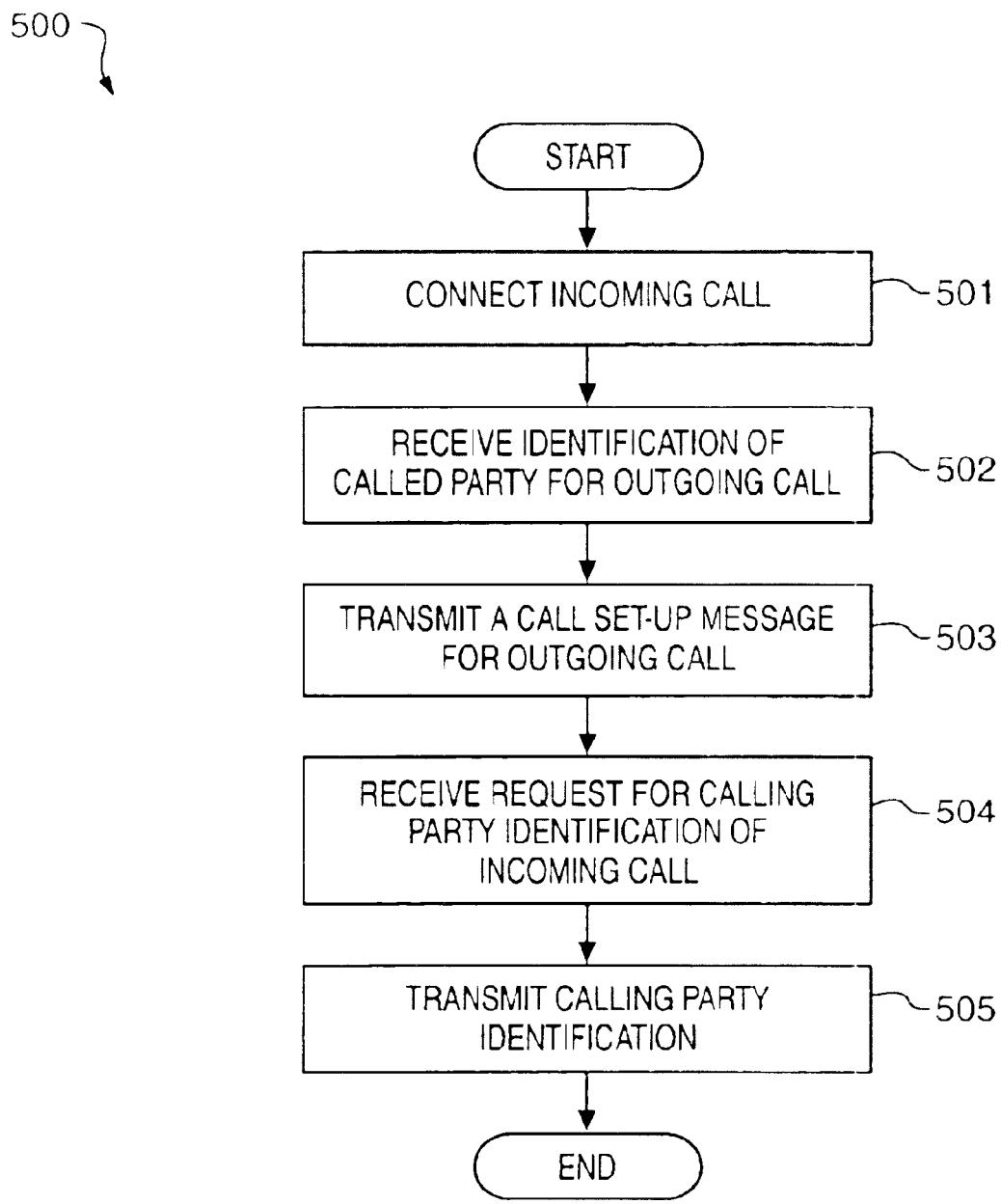
FIG. 5 illustrates a flow diagram of a process executed by a terminal to provide this invention.

FIG. 5 illustrates operational steps performed by a terminal to provide a calling party identification to a called party for relayed telephone calls. The same process is used regardless as to whether the incoming call is a voice call or a TDD/TYY call. Process 500 begins in step 501 with a terminal 120–121 connecting an incoming call. In step 502, the terminal receives an identification of a called party for an outgoing call. In most cases, this identification is a telephone number. In step 503, the terminal transmits a call set-up request to the switching system 110 to set up the outgoing call based on the called party identification.

In step 504, the terminal receives a request for the identification of the calling party for the incoming call. In the preferred embodiment, this request is from call controller 140. However, the request may be from switching system 101. In response to the request, the terminal transmits a reply including the calling party identification in step 505 and process 500 ends. It should be noted the reply may be transmitted to either call controller 140 or switching system 101.

The above-described steps in the processes of the embodiments of this invention can be comprised of instructions that are stored on storage media. The instructions can be retrieved and executed by a processing unit. Some examples of instructions are software, program code, and firmware. Some examples of storage media are memory devices, tape, disks, integrated circuits, and servers. The instructions are operational when executed by the processing unit to direct the processing unit to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method for providing an identification of a calling party to a called party for calls being handled at a call center, said method comprising the steps of:

receiving a first call set-up message in a switching system to set-up an incoming call to a terminal in said call center, wherein said incoming call is a voice call from a telephone set to a TDD/TYY device or a TDD/TYY call from a TDD/TYY device to a telephone set;

transmitting an available terminal request to a call controller, wherein said available terminal request includes an indication whether said incoming call is a voice call to a TDD/TYY device or a TDD/TYY call from a TDD/TYY device;

receiving an available terminal response that includes an identification of said terminal to handle said incoming call;

extending said incoming call from said switching system to said terminal;

receiving a set-up request in said switching system from said terminal to set-up an outgoing call to said called party;

generating a second call set-up message including said identification of said calling party; and transmitting said second call set-up message to said called party.

2. The method of claim 1 further comprising the steps of:

transmitting a first identification request from said switching system for said identification of said calling party; and receiving a first identification response to said first identification request including said identification of said calling party in said switching system.

3. The method of claim 2 further comprising the step of:

receiving said first identification request for said identification of said calling party in said terminal; and transmitting said first identification response including said identification of said calling party to said switching system in response to receiving said first identification request.

4. The method of claim 2 further comprising the steps of:

receiving said first identification request for said identification of said calling party in a call controller; and transmitting said first identification response including said identification of said calling party from said call controller to said switching system in response to receiving said first identification request.

5. The method of claim 4 further comprising the step of:

transmitting a second identification request for said identification of said calling party from said call controller to said terminal responsive to receiving said first identification request from said switching system.

6. The method of claim 5 further comprising the step of:

receiving a second identification response including said identification of said calling party in said call controller from said terminal.

7. The method of claim 5 further comprising the steps of:

receiving said second identification request from said call controller in said terminal;

generating a second identification response; and transmitting said second identification response to said call controller.

8. The method of claim 1 further comprising the step of:

receiving said incoming call in said terminal.

9. The method of claim 8 further comprising the steps of:

receiving an identification of said called party of said outgoing call in said terminal; and transmitting said second call set-up message to said switching system responsive to receiving said identification of said called party.

10. A call center that provides a called party with an identification of a calling party for telephone communications that are relayed through said call center comprising:

a switching system;

a plurality of terminals connected to said switching system;

a call controller connected to said switching system;

a processing unit in said switching system; and first instructions for directing said processing unit in said switching system to:

receive a first call set-up message requesting an incoming call be extended to a terminal of the plurality of terminals in said call center, wherein said incoming call is a voice call from a telephone set to a TDD/TYY device or a TDD/TYY call from a TDD/TYY device to a telephone set, transmit an available terminal request to said call controllers wherein said available terminal request includes an indication whether said incoming call is a voice call to a TDD/TYY device or a TDD/TYY call from a TDD/TYY device, receive an available terminal response that includes an identification of said terminal to handle said incoming call, extend said incoming call to said terminal, receive a set-up request from said terminal to set-up an outgoing call to said called party, generate a second call set-up message including said identification of said calling party, and transmit said second call set-up message to said called party; and a media readable by said processing unit in said switching system that stores said first instructions.

11. The call center of claim 10 wherein said first instructions for directing said processing unit in said switching system comprise:

first instructions for directing said processing unit in said switching system to:

transmit a first identification request for said identification of said calling party; and receive a first identification response to said first identification request including said identification of said calling party.

12. The call center of claim 11 further comprising:

a processing unit in said terminal;

second instructions for directing said processing unit in said terminal to:

receive said first identification request for said identification of said calling party;

transmit said first identification response including said identification of said calling party to said switching system in response to receiving said first identification request; and a storage media that is readable by said processing unit in said terminal for storing said second instructions.

13. The call center of claim 11 further comprising:

a processing unit in said call controller;

third instructions for directing said processing unit in said call controller to:

receive said first identification request for said identification of said calling party; and transmit said first identification response including said identification of said calling party to said switching system in response to receiving said first identification request; and a storage media readable by said processing unit in said call controller for storing said third instructions.

14. The call center of claim 13 wherein said third instructions for directing said processing unit in said call controller further comprise:

third instructions for directing said processing unit in said call controller to:

transmit a second identification request for said identification of said calling party to said terminal responsive to receiving said first identification request from said switching system.

15. The call center of claim 14 wherein said third instructions for directing said call controller further comprise:

third instructions for directing said processing unit in said call controller to:
receive a second identification response including said identification of said calling party from said terminal.

16. The call center of claim 14, further comprising:
a processing unit in said terminal;
second instructions for directing said processing unit in said terminal to:
receive said second identification request from said call controller;
generate a second identification response; and
transmit said second identification response to said call controller: and
a storage media that is readable by said processing unit in said for storing said second instructions.

17. The call center of claim 10 further comprising:
a processing unit in said terminal;
second instructions for directing said processing unit in said terminal to:
receive said incoming call; and
a storage media that is readable by said processing unit in said terminal for storing said second instructions.

18. The call center of claim 17 wherein said second instructions for directing said processing unit in said terminal further comprise:
second instructions for directing said processing unit in said terminal to:
receive an identification of said called party of said outgoing call; and
transmit said second call set-up message to said switching system responsive to receiving said identification of said called party.

19. A switching system in a call center providing relay services between a calling party and a called party that provides an identification of said calling party in call set-up messages transmitted to said called party responsive to said calling party calling said called party through said call center, said switching system comprising:

a processing unit;
instructions for directing said processing unit to:
receive a first call set-up message requesting an incoming call be extended to a terminal in said call center, wherein said incoming call is a voice call from a telephone set to a TDD/TYY device or a TDD/TYY call from a TDD/TYY device to a telephone set,
transmit an available terminal request to said call controller wherein said available terminal request includes an indication whether said incoming call is a voice call to a TDD/TYY device or a TDD/TYY call from a TDD/TYY device,
receive an available terminal response that includes an identification of said terminal to handle said incoming call,
extend said incoming call to said terminal,
receive a set-up request from said terminal to set-up an outgoing call to said called party,
generate a second call set-up message including said identification of said calling party, and
transmit said second call set-up message to said called party; and a media readable by said processing unit in said switching system that stores said instructions.

20. The switching system of claim 19 wherein said instructions for directing said processing unit in said switching system comprise:
instructions for directing said processing unit in said switching system to:
transmit a first identification request for said identification of said calling party; and
receive a first identification response to said first identification request including said identification of said calling party.

21. The switching system of claim 20 wherein said first identification request is transmitted to said terminal.

22. The switching system of claim 20 wherein said first identification request is transmitted to a call controller.

23. A method of operating a switching system for providing relay services between a calling party and a called party that provides an identification of said calling party in call setup messages transmitted to said called party responsive to said calling party calling said called party through a call center, said method comprising the steps of:

receiving a first call set-up message to setup an incoming call to a terminal in said call center, wherein said incoming call is a voice call from a telephone set to a TDD/TYY device or a TDD/TYY call from a TDD/TYY device to a telephone set;

transmitting an available terminal request to a call controller, wherein said available terminal request includes an indication whether said incoming call is voice call to a TDD/TYY device or a TDD/TYY call from a TDD/TYY device;

receiving an available terminal response that includes an identification of said terminal to handle said incoming call;

extending said incoming call to said terminal;

receiving a set-up request from said terminal to set-up an outgoing call to said called party;

generating a second call set-up message including said identification of said calling party; and transmitting said second call set-up message to said called party.

24. The method of claim 23 further comprising the steps of:

transmitting a first identification request for said identification of said calling party; and receiving a first identification response to said first identification request including said identification of said calling party.

25. The method of claim 24 wherein said first identification request is transmitted to said terminal.

26. The method of claim 24 wherein said first identification request is transmitted to a call controller.

* * * * *